United States Patent [19]
Basch et al.

[11] Patent Number: 6,119,103
[45] Date of Patent: Sep. 12, 2000

[54] FINANCIAL RISK PREDICTION SYSTEMS AND METHODS THEREFOR

[75] Inventors: Catherine A. Basch, Pleasanton; Belva J. Bruesewitz, Danville; Kevin Siegel, Fremont; Patrick Faith, Pleasanton, all of Calif.

[73] Assignee: Visa International Service Association, Foster City, Calif.

[21] Appl. No.: 08/863,666

[22] Filed: May 27, 1997

[51] Int. Cl.⁷ .................................................. G06F 157/00
[52] U.S. Cl. ............................................................... 705/35
[58] Field of Search ................................. 705/35, 38–40, 705/44; 235/379–381

[56] References Cited

U.S. PATENT DOCUMENTS

| | | |
|---|---|---|
| 4,326,259 | 4/1982 | Cooper et al. |
| 4,346,442 | 8/1982 | Musmanno ............................. 364/408 |
| 4,376,978 | 3/1983 | Musmanno ............................. 364/408 |

(List continued on next page.)

FOREIGN PATENT DOCUMENTS

| | | | |
|---|---|---|---|
| 0468229A2 | 5/1992 | European Pat. Off. ........ | G06F 15/80 |
| 0468229A3 | 5/1992 | European Pat. Off. ........ | G06F 15/80 |
| WO94/06103 | 3/1994 | WIPO . | |
| WO94/60103 | 3/1994 | WIPO .............................. | G07F 7/10 |

OTHER PUBLICATIONS

Chandler, "Credit Scoring", Credit Union Executive, Dialog file 648, Jul. 1985.

Grafton, "Analysing customers with behavioural modelling", Credit Control, v17n6, PP:27–31, dialog file 15, Accession No. 01265295, 1996.

"Credit Risk Management Report", V.3, No. 19, Phylips Business Information, Inc., dialog file 636, Accession No. 02020764, Sep. 17, 1993.

Aguais, "It's the economy, issuer!", Credit Card Management, V5n11, PP: 58–60, Feb. 1993, dialog file 15, Accession No. 00681693.

Higgins, "Retention by the numbers", Credit Card Management, v5n11, PP:52–56, Feb. 1993, dialog file 15, Accession No. 00681692.

Leonard et al., "Automating the credit decision process", Journal of Retail Banking, v16, n1, p39(6), Spring 1994, Dialog file 148, Accession No. 07816398.

Healy, "The new science of borrower behavior", Mortgage Banking, v58, n5, p26(8), Feb. 1998, dialog file 148, Accession No. 10389009.

Purcell, Lea "Roping in Risk, May 1994", Bank System Technology, pp. 64–68.

Quinn, Jane, Credit Card Issuers Keeping Closer Watch on How you Pay Bills, Apr. 25, 1988, Washington Post, Business Section, p. 67.

Cooper et al., "Adaptive Pattern Recognition: Neural Networks in Real World Applications", Jun. 18, 1989, Tutorial IEEE/INNS International Joint Conference on Neural Networks.

(List continued on next page.)

*Primary Examiner*—Frantzy Poinvil
*Attorney, Agent, or Firm*—Beyer & Weaver, LLP

[57] ABSTRACT

A computer-implemented method for predicting financial risk, which includes receiving first transaction data pertaining to transactions performed on a first financial account. The first financial account represents a financial account issued to a given account holder by a first account issuer. The method further includes receiving second transaction data pertaining to transaction performed on a second financial account different from the first financial account. The second financial account represents a financial account issued to the given account holder by a second account issuer different from the first account issuer. There is further included scoring the first transaction data and the second transaction data based on a preexisting model to form a score for the account holder. Additionally, there is included transmitting, if the score is below a predefined financial risk threshold, the score to one of the first account issuer and the second account issuer.

34 Claims, 10 Drawing Sheets

U.S. PATENT DOCUMENTS

| | | |
|---|---|---|
| 4,460,604 | 7/1988 | Cooper et al. . |
| 4,597,046 | 6/1986 | Musmanno et al. ............... 364/408 |
| 4,718,009 | 1/1988 | Cuervo ............... 364/408 |
| 4,734,564 | 3/1988 | Boston et al. ............... 235/380 |
| 4,736,294 | 4/1988 | Gill et al. ............... 364/408 |
| 4,774,663 | 9/1988 | Musmanno et al. ............... 364/408 |
| 4,774,664 | 9/1988 | Campbell et al. ............... 364/408 |
| 4,812,628 | 3/1989 | Boston et al. ............... 235/380 |
| 4,868,866 | 9/1989 | Williams, Jr. ............... 380/49 |
| 4,914,587 | 4/1990 | Clouse ............... 364/408 |
| 4,953,085 | 8/1990 | Atkins ............... 364/408 |
| 4,989,141 | 1/1991 | Lyons et al. ............... 364/408 |
| 5,025,138 | 6/1991 | Cuervo ............... 235/379 |
| 5,038,284 | 8/1991 | Kramer ............... 364/408 |
| 5,161,103 | 11/1992 | Kosaka et al. ............... 364/408 |
| 5,177,342 | 1/1993 | Adams ............... 235/379 |
| 5,239,462 | 8/1993 | Jones et al. ............... 364/408 |
| 5,262,941 | 11/1993 | Saladin et al. ............... 364/408 |
| 5,274,547 | 12/1993 | Zoffel et al. ............... 364/408 |
| 5,323,315 | 6/1994 | Highbloom ............... 364/408 |
| 5,325,298 | 6/1994 | Gallant ............... 364/419.19 |
| 5,361,201 | 11/1994 | Jost et al. ............... 364/401 |
| 5,398,300 | 3/1995 | Levey ............... 395/22 |
| 5,444,819 | 8/1995 | Negishi ............... 395/22 |
| 5,479,573 | 12/1995 | Keeler et al. ............... 395/23 |
| 5,819,226 | 10/1998 | Gopinathan et al. . |

OTHER PUBLICATIONS

Robert Hecht–Nielsen, "Theory of the Backpropagation Neural Network", Department of Electrical and Computer Engineering, University of California at San Diego, La Jolla, CA.

Karen Gullo, "Neural Nets Versus Card Fraud, Chase's Software Learns to Detect Potential Crime", Feb. 2, 1990, American Banker.

Caudill et al., "Neural network Applications", 1990, Naturally Intelligent Systems, A Bradford Book, The MIT Press.

"Cardholder Risk Identification Service, Service Description", Jan. 1995.

"Cardholder Risk Indentification Service, Chapter 1", Sep. 1997.

FINANCIAL RISK PREDICTION SYSTEMS AND METHODS THEREFOR

RELATED PATENT APPLICATION

The following patent application(s) are incorporated herein by reference. Commonly assigned patent application entitled "Method and Apparatus for Pattern Generation," by inventors Kevin P. Siegel, Patrick L. Faith, and Theodore P. Washburne, filed on even date (Attorney Docket No. VISAP002).

BACKGROUND OF THE INVENTION

The present invention relates to financial risk prediction systems (FRPS). More particularly, the present invention relates to improved methods and apparatus for a transaction-based risk prediction system that advantageously assess the financial risk level associated with an account and/or an account holder based on the account holder's transaction pattern and/or transactions pertaining to that account holder across multiple accounts and/or account issuers.

In recent years, account issuers (e.g., banks, credit unions, mortgage companies, and the like) have significantly increased the types and volumes of accounts issued to account holders. A typical account holder (e.g., an individual or business account holder) nowadays may be issued, for example, multiple charge (credit) accounts, one or more mortgages, multiple revolving accounts, and/or one or more installment payment plans. For a majority of account holders, good financial planning results in financial stability and solvency. There are, however, a significant percentage of account holders who, for various reasons (e.g., unanticipated changes in life's circumstances, credit abuse, or even fraud), do not live up to the obligations they incurred to account issuers.

When account holders default (e.g., simply refuse to pay the amount owed or declare bankruptcy altogether), account issuers may at times be forced to resort to costly collection procedures and/or to write off the amounts owed altogether. As can be appreciated from the foregoing, when an account holder declares bankruptcy for example, the amount lost may be substantial since most or all credit accounts (charge/credit accounts, mortgages, revolving accounts, installment payment plans, and/or others) may be discharged under bankruptcy laws. The losses increase, for example, the cost of credit to all current and potential account holders, including those having satisfactory credit histories.

To minimize losses, account issuers have constantly been searching for ways to predict in advance accounts and/or account holders who are at risk for credit default and/or fraud. By way of example, account issuers routinely employ credit bureaus, essentially data collection services, to ascertain whether an applicant for new or additional credit is sufficiently credit-worthy for the type of account and amount that he is applying for. If an applicant wishes to apply for a Visa credit card account, for example, a potential issuing bank may request a credit report on the applicant from one or more credit bureaus to ascertain whether the applicant has a satisfactory credit history, adequate income, reasonable debt-to-income ratio, and the like, before deciding whether the applicant should be approved for the credit account and what the appropriate credit limit should be.

To facilitate the management of accounts, account issuers may employ scores developed by credit bureaus. These scores may, for example, be utilized to assist in some aspects of account management, e.g., in the account issuer's decision to increase or decrease the current limit.

Although the use of credit bureaus eliminates some financial risk, there are disadvantages. For example, it is known that not all account issuers report to credit bureaus. Some account issuers may choose to report only to a selected credit bureau but not another, making it difficult for an account issuer to efficiently obtain a complete credit history pertaining to a particular applicant.

Still further, it is widely known that credit bureau data is prone to error. The errors may arise from delayed or inaccurate delivery of the account holder's payment to the account issuers, through inaccurate data entry of the part of the account issuers, through erroneous reporting by the account issuers, and/or inaccurate data processing by the credit bureaus themselves. Accordingly, it is not uncommon for individuals who are objectively poor financial risks to be given satisfactory scores by the credit bureaus, and vice versa.

Most significantly, credit bureau data typically pertains only to account data, e.g., account types, account limits, and historical payment information. As such, the data kept by credit bureaus is significantly dated since data from the various account issuers is typically not updated with the credit bureaus until after the end of each billing cycle (which may be, for example, monthly or quarterly). Accordingly, the credit bureaus typically do not have accurate or adequate data pertaining to the credit performance of a particular account holder in between reporting periods. Since credit bureau scores are not based on financial transaction data, a credit bureau would not be able to, for example, warn account issuers that certain accounts and/or account holders are at risk based on the recent transactions.

The credit bureaus do not have the ability to ascertain transaction pattern to warn account issuers of potential financial risks. If, for example, an individual intends to commit credit abuse, fraud, and/or to file bankruptcy in the near future, a credit bureau would not be able to know and to issue warnings to account issuers that this individual has, in the last few days, systematically and in an uncharacteristic manner, used up his credit of his charge accounts. In fact, the credit bureaus may continue to assign satisfactory scores to that individual (thereby enabling that individual to continue making purchases on credit, obtaining additional credit and/or opening additional credit accounts) until the account holder misses one or more billing cycles and/or files for bankruptcy.

The account issuers themselves also developed techniques to gauge the credit worthiness of a particular potential or current account holder based on how that account holder pays on an account. By way of example, behavioral scoring systems may be employed to monitor the payment performance of an account (e.g., by monitoring the payment data and the relationship between credit line and balance) in their assessment of an individuals credit worthiness. However, since the payment performance of an account is updated only per billing cycle, this technique also typically does not provide adequate warnings pertaining the financial risk of a particular account holder based on activities occurring in more recent history. By way of example, if an account holder's past payment performance on an account has been satisfactory, he may, in the last few days, use up substantially all the available credit of one or more accounts (thereby putting him at a higher financial risk) without triggering an alert from the account issuers' payment-based scoring systems.

Some account issuers or third party processors may be able to, for example, utilize transaction data on a specific account to assess risk with respect to that account. By way of example, account issuers or third party processors may employ rule-based systems to flag accounts having transactions exceeding a certain dollar amount within a predefined period. If, for example, an account holder withdraws more than $3000.00 in cash in one month from a particular account, the rule-based system may flag that account for future investigation.

Furthermore, since account issuers do not typically share financial data pertaining to account holders (due to, e.g., competitive or legal reasons), it is not possible for an account issuer to know that a particular account holder has incurred, in the time interval since the last billing cycle, significant credit obligations to another account issuer. Accordingly, even if a particular account holder may be known to one account issuer to have a higher financial risk since the last billing cycle, this important piece of information is unavailable to the credit bureaus until the end of the current billing period. Accordingly, this knowledge is denied to other account issuers until at least the end of the billing period, rendering their credit lines unduly vulnerable.

Because of the shortcomings of existing behavioral scoring systems, it is possible for an account holder to, in preparation for bankruptcy filing, charge up his various credit accounts with different account issuers substantially undetected. In fact, it has been found that up to 40% of credit accounts involved in bankruptcy filings still have charging privileges. The inability of prior art financial risk monitoring techniques to timely provide warnings pertaining to abusive credit practice to the account issuers creates not only financial losses to the account issuers but also a loss of confidence in the minds of the consuming public.

In view of the foregoing, there are desired improved financial risk prediction systems and methods therefor which minimize financial losses to the account issuers and/or account holders. The improved financial risk prediction system preferably employs data that facilitates timely warnings of potential financial risks to the account issuers to enable the account issuers to take steps in time to minimize further financial losses. The improved financial risk prediction technique more preferably provides the aforementioned timely warnings at the account holder level, thereby advantageously enabling a given account issuer to ascertain the credit-worthiness of a particular account holder and to take steps to protect outstanding credit lines even if, for example, the financial risk is assessed on transactions performed on accounts belonging to other account issuers.

SUMMARY OF THE INVENTION

The invention relates, in one embodiment, to a computer-implemented method for predicting financial risk, which includes receiving transaction data pertaining to a plurality of transactions for a financial account, the transaction data including one of a transaction type and a transaction amount for each of the plurality of transactions. The method further includes scoring the transaction data, including a transaction pattern ascertained from the transaction data, based on a preexisting model to form a score for the financial account. The method further includes transmitting, if the score is below a predefined financial risk threshold, the score to an account issuer of the financial account.

In another embodiment, the invention relates to a computer-implemented method for predicting financial risk, which includes receiving first transaction data pertaining to transactions performed on a first financial account. The first financial account represents a financial account issued to a given account holder by a first account issuer. The method further includes receiving second transaction data pertaining to transaction performed on a second financial account different from the first financial account. The second financial account represents a financial account issued to the given account holder by a second account issuer different from the first account issuer. There is further included scoring the first transaction data and the second transaction data based on a preexisting model to form a score for the account holder. Additionally, there is included transmitting, if the score is below a predefined financial risk threshold, the score to one of the first account issuer and the second account issuer.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
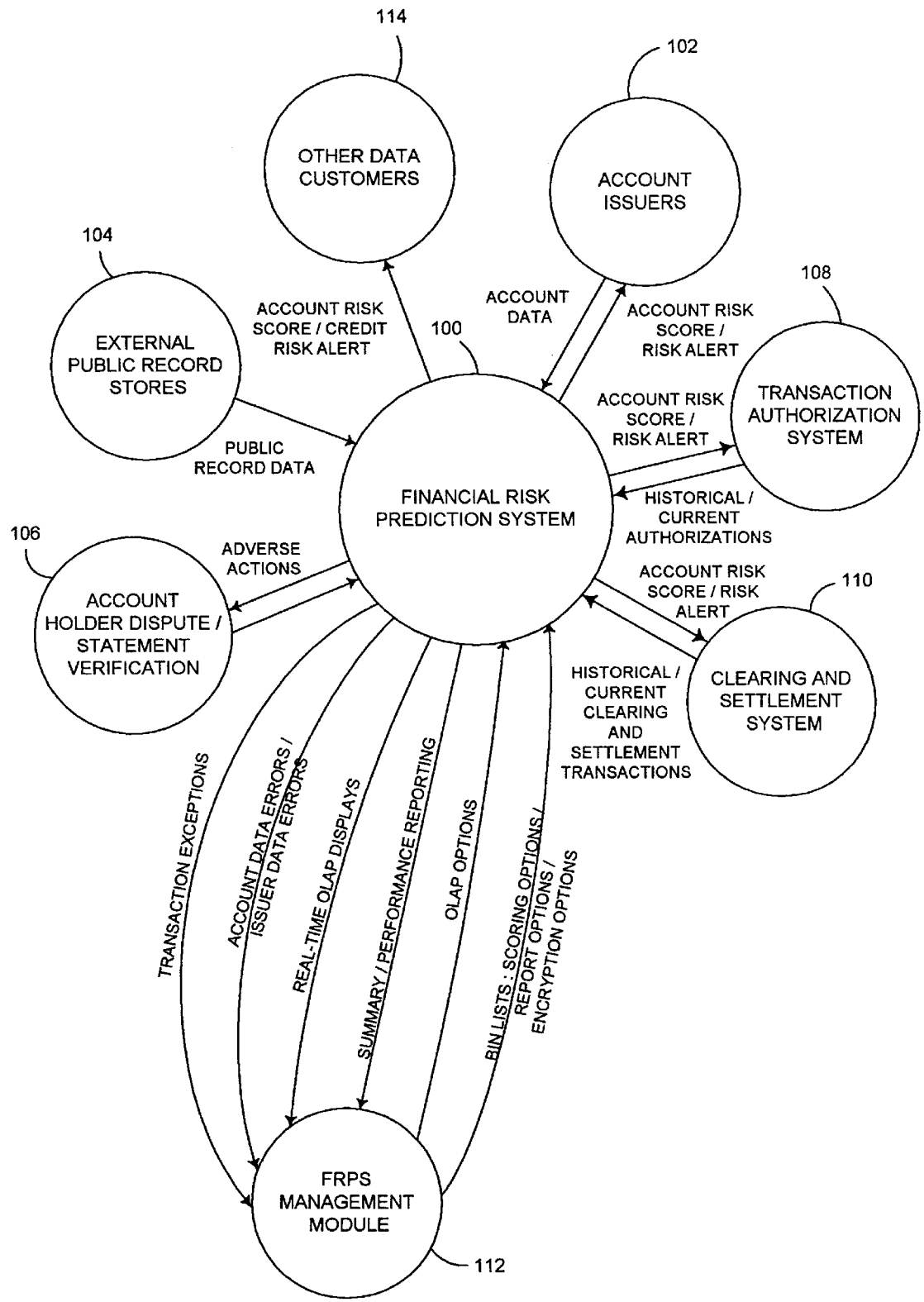
FIG. 1 illustrates, in accordance with one embodiment of the present invention, a financial risk prediction system (FRPS), including the data sinks and data sources coupled thereto.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, there are provided improved financial risk prediction techniques that advantageously employ scoreable transactions as input data to assess the level of financial risk of a particular account and/or account holder. As the term is employed herein, scoreable transactions represent events pertaining to an account and/or an account holder that impact the financial risk level of that account and/or account holder. Examples of scoreable transactions include, for example, authorization requests for purchases of goods or services made on credit, clearing and settlement transactions between merchants and account issuers pertaining to one or more accounts, account issuer-supplied account records, public records, and the like.

Unlike prior art risk prediction techniques which typically employ only historical payment data for financial risk assessment purposes, the present invention advantageously takes advantage of the immediacy of scoreable transactions in assessing financial risks. Since scoreable transactions more accurately reflect the current financial risk level of a particular account and/or account holder than historical payment data, the use of scoreable transactions in assessing financial risk advantageously enables account issuers to timely receive financial risk scores based on events that impact financial risk rather than on data which are updated only monthly or per billing cycle.

In accordance with another aspect of the present invention, the scoreable transactions are further analyzed to ascertain a scoreable transaction pattern. The scoreable transaction pattern ascertained is then scored to assess the financial risk level of a particular account and/or account holder. If, for example, the scoreable transaction pattern reveals a spending pattern suggestive of a high likelihood of bankruptcy, credit loss or fraudulent usage, an appropriate financial risk score may be sent to subscribing account issuer(s) to enable those account issuers to take steps to protect the credit lines (e.g., refusing to authorize additional purchases until an investigation is undertaken). Since the pattern is based on the immediacy of scoreable transactions, the risk of bankruptcy, credit loss or fraudulent usage may be detected even if all transactions suggestive of such an enhanced level of financial risk occur solely in between billing cycles.

In accordance with yet another aspect of the present invention, there are provided improved financial risk prediction techniques that advantageously analyze scoreable transactions across accounts and/or account issuers (i.e., at the account holder level instead of account level). Unlike prior art risk prediction techniques which look only at payment data pertaining to a particular account (e.g., as in the case of the aforementioned behavioral scoring systems) or historical payment data across several accounts (e.g., as in the case of prior art credit bureau scoring techniques), the invention advantageously assesses, in one embodiment, scoreable transactions pertaining to an account holder across different accounts and/or account issuers and analyzes those scoreable transactions to generate a consolidated, i.e., account holder-level, financial risk score.

For example, if the aggregate scoreable transactions across different accounts of a particular account holder suggest a heightened level of financial risk, the invention advantageously generates a financial risk score that reflects this enhanced level of financial risk, although a lower financial risk level may be ascertained if each account (and transactions pertaining thereto) is analyzed individually. As a further example, if the inventive financial risk prediction technique detects an enhanced financial risk level based on scoreable transactions pertaining to an account or accounts of an account holder, an appropriate financial risk score may be generated and forwarded to all subscribing account issuers even though these scoreable transactions may pertain only to one account of one single account issuer.

The use of scoreable transactions in assessing financial risk is nonobvious since under current financial systems and structures, scoreable transactions are not centralized in a particular database and are not readily obtainable. As mentioned, account issuers typically do not, for competitive and/or legal reasons, share financial data pertaining to account holders. Because of this, account issuers may not readily consider the feasibility of using transactional data in assessing financial risks since they may perceive that since no account issuer has access to all transactions pertaining to an account holder, any financial risk assessment based on the available partial set of data may be too skewed to be of use.

Additionally, it is not obvious that certain account-related events may also constitute scoreable transactions, i.e., they are events that impact an account holder's risk level although they are not "transactions" in the classic sense. As will be explained in detail herein, the invention advantageously classifies certain types of events reported from various account issuers, public agencies, private data collection services, as scoreable transactions (even if some do not involve an exchange of credit for goods, services, or cash) to assess financial risk. The use of various types of data from multiple data sources as scoreable transactions, the aggregate of which may be heretofore perceived as unobtainable by any single entity under current financial structures, advantageously permits the inventive financial risk prediction system to timely and satisfactorily provide a prediction of the financial risk level of an account and/or account holder, thereby enabling account issuers to take steps, if appropriate, to reduce the potential financial loss.

To facilitate this discussion of the features and advantages of the present invention, FIG. 1 illustrates, in accordance with one embodiment of the present invention, a financial risk prediction system (FRPS) 100, as well as the data sinks and data sources coupled thereto. In FIG. 1 as well as the figures herein, the discussion is generally limited to revolving charge accounts, more popularly known as credit card accounts and in particular Visa credit accounts, to facilitate ease of understanding and consistency of discussion. It should be noted, however, that the inventive financial risk prediction techniques apply to any credit arrangement wherein there exists a need to generate, in a timely and efficient manner, financial risk scores based on scoreable transactions for a particular account and/or account holder.

Referring now to FIG. 1, there is shown a financial risk prediction system (FRPS) 100, which represents the computer-implemented system for assessing the level of financial risk pertaining to an account and/or account holder based on scoreable transactions. As will be explained in detail herein, the scoreable transactions are scored against predictive model(s) within FRPS 100 to generate financial risk scores and/or financial risk alerts for the account issuers.

To authenticate the scoreable transactions and to facilitate the creation of appropriate predictive model(s), FRPS 100 may receive data from a variety of data sources. For example, a variety of account/account holder-level (herein "AAC-level" data) may be received from multiple data sources to facilitate the creation of the initial predictive model. As the term is used herein, AAC-level data pertains to data other than financial transaction data (i.e., other than data relating to the exchange of credit for goods, services, cash, or the like which requires authorization and/or clearing and settlement). Although the AAC-level data records are employed mostly in the authentication of scoreable transactions and/or in building the predictive models, some AAC-level data records may also represent scoreable transactions. For example, the opening of a new credit account, the filing of a divorce or bankruptcy, and the like may represent AAC-level events that change in the level of financial risk of a particular account and/or account holder and should therefore be scored against the predictive model(s) to generate warnings, if any, to the subscribing account issuers.

FRPS 100 may, for example, periodically receive account data from account issuers 102 (e.g., via cartridge tapes or periodic automated inputs). The account data may include, for example, card holder account information including, for example, account number, open date, primary social security number, secondary social security number (of a second person on the account in the case of a joint account), primary card holder name, secondary card holder name (in the case of a joint account), street address, state code, postal code, account change indicator (which may indicate a change in the status of the account since the last report), charge-off date, account status, replacement account number (in case of a lost/stolen account), account issuer tape creation date (in the case the account data is delivered to FRPS 100 via computer tapes), and the like.

Other account data may be supplied from account issuer 102 to FRPS 100 as appropriate. In one example, the account data may be formatted using the well known Associated Credit Bureau's Metro file format (either the packed format or the character format) to facilitate ease of processing. Further details regarding the aforementioned Metro file format may be obtained in "Metro Format For Consumer Credit Reporting," Associated Credit Bureaus, Inc., 1994, 1996, incorporated herein by reference. Preferably, account data pertaining to all currently open accounts, as well as those currently in delinquency, bankruptcy or non-bankrupt charge-offs are provided to FRPS 100 periodically to permit proper authentication of scoreable transactions and/or creation of the predictive model(s).

In accordance with a particularly advantageous aspect of the present invention, FRPS 100 also employs public record data from various external public record stores 104 in the authentication of scoreable transactions and/or creation of the predictive model(s). Depending on the type of public record data involved, FRPS system 100 may receive the public record data from external public record stores 104 intermittently, monthly, daily, or even more frequently.

For example, FRPS 100 may receive public bankruptcy data records, which may include, for example, new filings, record releases, and record corrections. Other types of public data having bearing on the financial risk level of account holders may also be received (e.g., divorce filings, tax liens, judgments, and the like). These public data records may include, for example, the social security number or tax ID, the name(s) of the person(s) and/or entity(ies) involved, street address, city, state, zip code, the filing date of the public record, the release date of the public record, the filing type, the court IID number, the case number, and the like. Credit bureau data, although not public in the sense that they are freely available, may also be received.

Other data sources input to FRPS 100 may include account holder disputes and/or statements 106, which are essentially inputs from account holders pertaining to particular accounts and/or account holders. The dispute action may, for example, challenge a delinquency report from an account issuer, or any other data from the account issuers, external public record stores, and/or other data sources which the account holder believes to be erroneous or require explanation. FRPS 100 may also provide reasons, e.g., explanations or transaction histories, to inform the account holder the rationale behind the risk assessed by FRPS 100. FRPS 100 may also provide reasons, e.g., explanations or transaction histories, to inform the account holder the rationale behind the risk ascertained by FRPS 100.

Transactional data may include, for example, historical and current authorizations from a transaction authorization system 108. A purchase of goods, services or a cash withdrawal using a credit account may require an authorization through a transaction authorization system (e.g., the Visa Integrated Payment ("VIP") system) before the transaction is approved to proceed. Authorizations may be received by FRPS 100 periodically (i.e., in batches), or individual authorizations may be received substantially simultaneously with the transactions to be authorized. Historical authorization data may represent, for example, authorization transactions of the recent past (e.g., the last 18 months). Historical authorizations are typically received once to facilitate the building of the predictive model(s). As mentioned earlier, authorizations represent one type of scoreable transaction employed to assess the level of financial risk of a particular account and/or account holder.

Clearing and settlement transactions between account issuers (e.g., banks) represent another type of scoreable transaction that may be employed to assess the financial risk level of a particular account and/or account holder. As shown in FIG. 1, historical and current clearing and settlement transactions may be received from FRPS 100 from a clearing and settlement system 110 periodically, for example hourly, daily or at any other predefined time interval, or intermittently as clearings and settlements occur.

Other inputs into FRPS 100 may include, for example, control parameters, which describe how to process data received from the various data sources. The control parameters may include, for example, BIN lists (i.e., lists of account number ranges from participating account issuers), scoring options, report options, encryption options, and the like. The control parameters, which may be received from account issuers via FRPS management module 112, are then employed by FRPS 100 to process the input data and properly format and encrypt the alerts and scores to the various data sinks (i.e., the receiver of the generated credit scores and/or credit alerts).

The performance analysis and management of FRPS 100 may be performed by FRPS management module 112. In one embodiment, Online Analytical Processing (OLAP) DSS agent automated SQL query software tools for data analysis and report delivery from Microstrategy, Inc. of Vienna, Virginia are employed in FRPS management module 112 to manage and monitor the performance of FRPS 100.

Performance monitoring may involve, for example, comparing the accounts which actually underwent bankruptcy, credit loss and/or fraudulent usage with those predicted by FRPS 100 to be at risk for bankruptcy, credit loss and/or fraudulent usage to gauge the performance of the predictive model(s) employed in FRPS 100. As shown in FIG. 1, the OLAP options are employed as one input into FRPS 100 for management and/or performance analysis purposes. Using the appropriate management/performance analysis tools, FRPS management module 112 may be able to receive from FRPS 100 data to facilitate monitoring and/or improvement of FRPS 100. Data received by FRPS management module 112 from FRPS 100 may include, for example, summary/performance reporting data, real time OLAP displays, account data errors and account issuer data errors (which are generated as incoming transactional and AAC-level data are authenticated), and transaction exceptions (i.e., reports on errors detected during transaction processing). The transaction exception data may allow a system administrator to double-check the transactions and/or AAC-20 level data that may be the source of the error to facilitate error resolution.

As a further example, a system administrator may be able to employ FRPS management module 112 to determine the appropriate threshold with which to generate financial risk alerts for a particular bank. Still further, FRPS management module 112 may be employed to correlate the bankruptcy rate for a particular type of account versus the transaction amount and to set the appropriate financial risk alert threshold for that type of account.

Using the inputs available to it, FRPS 100 creates predictive model(s) and employs them in scoring scoreable transactions. By way of example, when an event constituting a scoreable transaction is received at FPS 100 (irrespective whether the scoreable transaction represents AAC-level data or data pertaining to a transaction to be authorized and/or cleared), the scoreable transaction is scored against the previously created predictive model(s) in FRPS 100 (using options specified via FRPS management module 112) to generate financial risk scores for a particular account and/or account holder. Multiple financial risk scores may be generated for a particular scoreable event, depending on the type of financial risk (e.g., bankruptcy, credit loss, fraudulent usage, and the like) that the account issuers are interested in (which in turn dictates which predictive model(s) would be employed for scoring).

The financial risk score(s) may then be delivered to the data sinks, i.e., entities interested in the financial risk level of a particular account and/or account holder. The financial risk scores may also be employed to generate financial risk alerts (based on, for example, financial risk alert thresholds set by the account issuers via FRPS management module 112) to the various data sinks. By way of example, financial risk scores and/or financial risk alerts may be delivered to transaction authorization system 108 to enable transaction authorization system 108 to either authorize or deny a particular authorization request. As a further example, financial risk scores and/or financial risk alerts may be delivered from FRPS 100 to clearing and settlement system 110 to assist in the clearing and settlement process between banks.

Additionally or alternatively, financial risk scores and/or financial risk alerts may be provided to one or more account issuers 102 to provide financial risk alerts pertaining to a particular account and/or account holder. As mentioned previously, a timely financial risk score and/or financial risk alert indicative of a high financial risk may enable account issuers to take steps to protect existing credit lines even if the transactions that trigger the score originate on an account belonging a different account issuer.

The financial risk scores and/or financial risk alerts may also be delivered to other data consumers 114. In one embodiment, a data consumer 114 may represent the delivery infrastructure by which a financial risk score and/or a financial risk alert are delivered to an account issuer. Other data consumers 114 may also represent, for example, appropriately authorized private and public data services interested in the financial risk level of an account and/or account holder.

Figure 2:
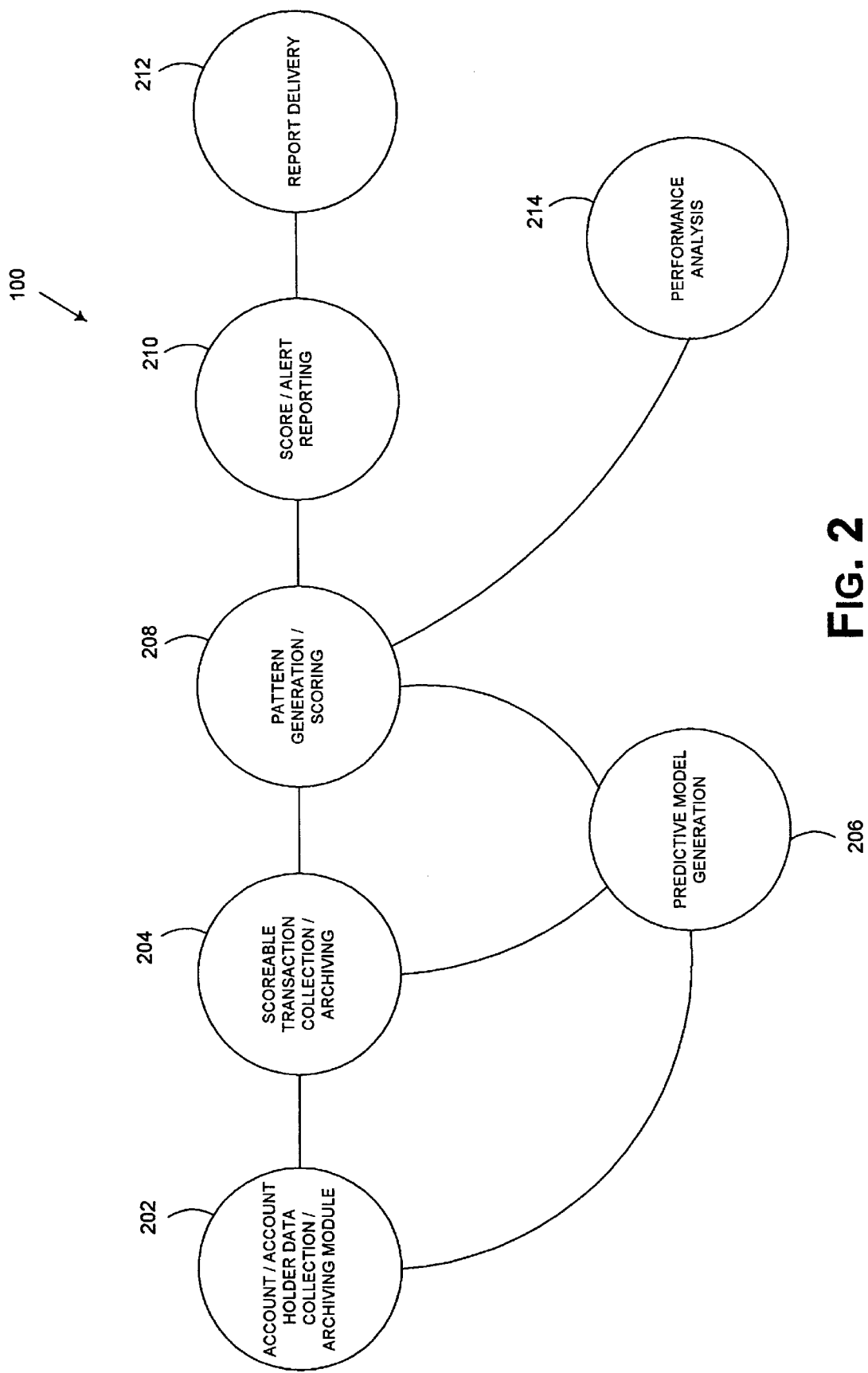
FIG. 2 illustrates, in accordance with one embodiment of the present invention, the logical modules which comprise the financial risk prediction system of FIG. 1.

FIG. 2 illustrates, in accordance with one embodiment of the present invention, the logical modules which comprise FRPS 100 of FIG. 1. The same logical modules which comprise FRPS 100, their inputs and outputs, as well as the data sources and sinks of FIGS. 1 and 2, are also shown in greater detail in FIGS. 3A and 3B. Although the inventive financial risk prediction technique has been grouped, in this embodiment, into seven logical modules to facilitate ease of understanding and implementation in software, it should be appreciated that other ways of logically grouping and organizing the tasks represented by the logical modules of FIG. 2 are also available. Accordingly, it should be borne in mind that the grouping is intended to facilitate ease of understanding and implementation, and is not intended to be limiting in any way.

Figure 3A:
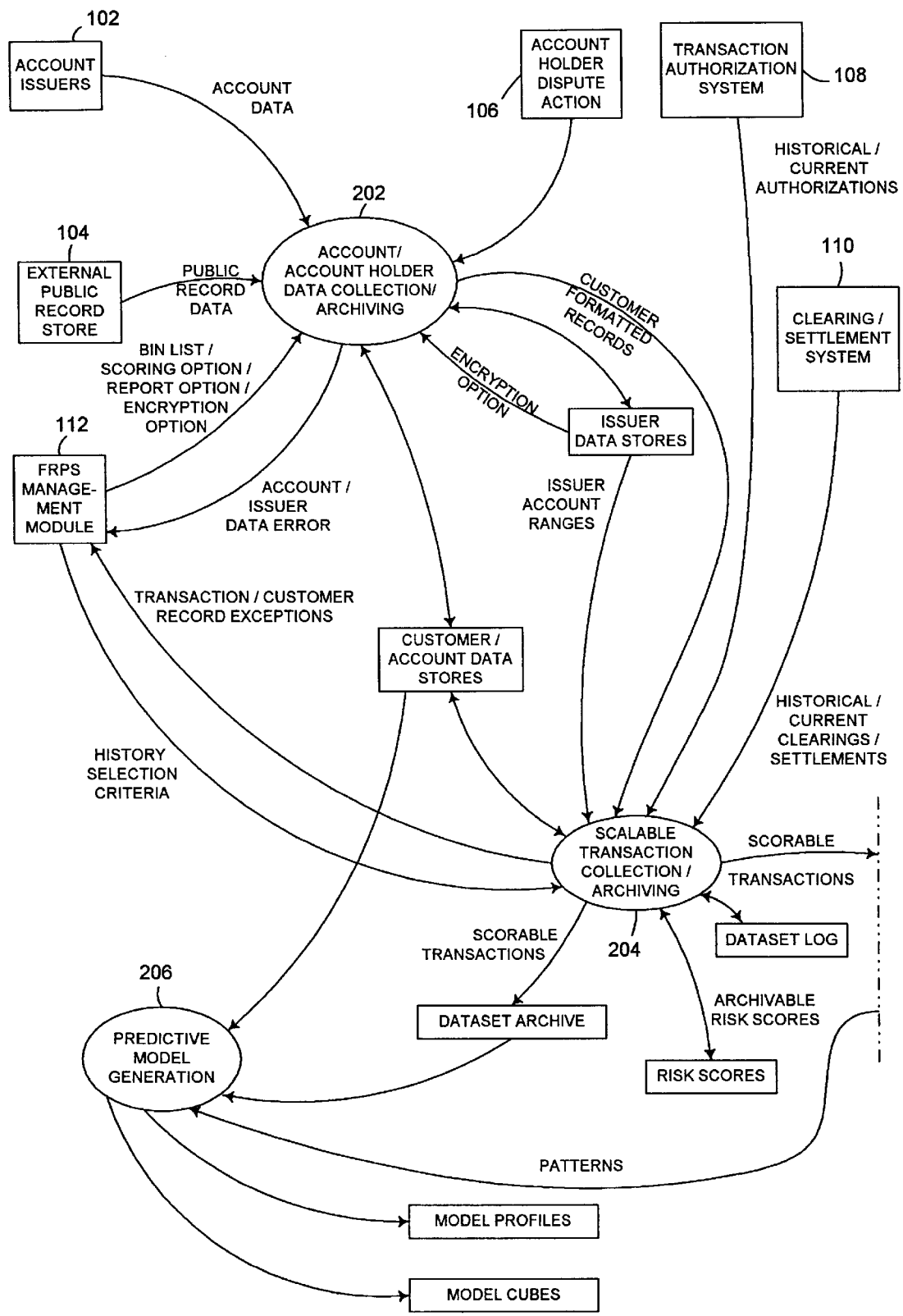
FIGS. 3A and 3B illustrate in greater detail the logical modules of the financial risk prediction system, their inputs and outputs, as well as the data sources and sinks of FIGS. 1 and 2.
Figure 3B:
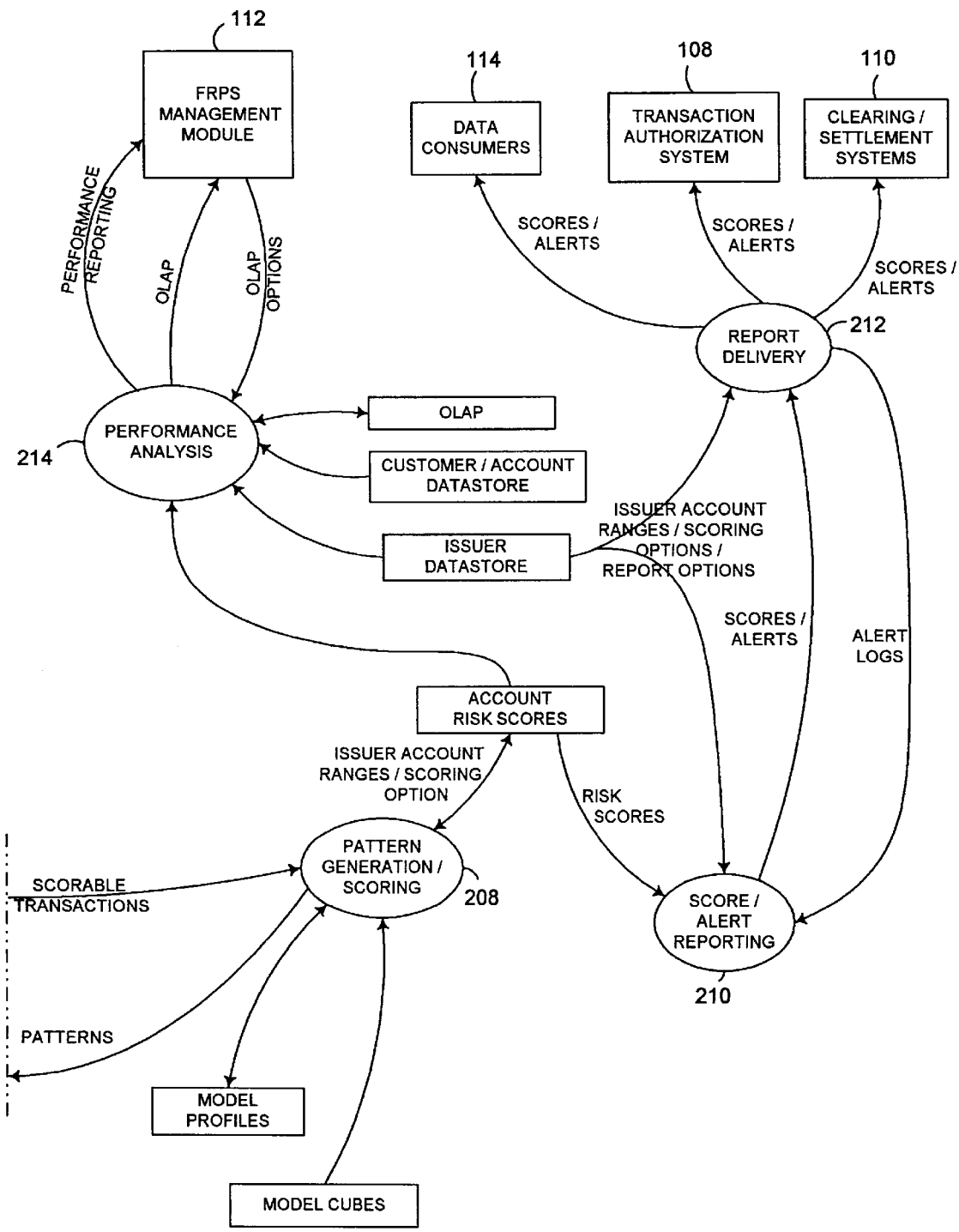

Referring now to FIGS. 2 and 3A/3B, there is shown an account/account holder data collection/archiving module 202, representing the logical module that handles the receipt, validation, and standardization of AAC-level data, e.g., account and account holder data. With reference to FIG. 1, for example, account/account holder data collection/archiving module 202 represents the logical module wherein account data and public records data are obtained from account issuers 102, external public record stores 104, and account holder dispute action module 106. Account/account holder data collection/archiving module 202 may also represent the module wherein data about participating account issuers and their scoring/reporting options are kept.

Via account/account holder data collection/archiving module 202, AAC-level data may be collected from the various data sources, decrypted and checked for validity and reasonability prior to being formatted into a standard internal record format.

The formatted record is then matched against existing account issuer and customer/account data stores of FRPS 100 (for example, by matching accounts against social security numbers, addresses, or the like) to check for validity. If the formatted AAC-level data record is found to be valid, it may be updated to existing account issuer and customer/account data stores. If there are errors detected in the formatted AAC-level data record, the errors may be flagged, e.g., to FRPS management module 112 of FIG. 1, for error resolution and/or reporting to the data source(s) from which the AAC-level data is obtained.

The account issuer data store represents, in one embodiment, a reference data store employed to hold information about participating account issuers, including their account ranges and the service options they have selected. By way of example, an account issuer data store may include the account issuer ID, the account issuer account range, options for scoring and alert threshold, encryption options (if any), report options (i.e., the format and media preference of any report generated by FRPS to the account issuer), and the like. The customer/account data store represents a reference data store employed to hold account and customer data, e.g., identity and status information, in a predefined format. The information in customer/account data store may be extracted from, for example, account data supplied from the issuers and various public records data feeds.

Selected AAC-level data records obtained via account/account holder data collection/archiving module 202 may be employed in the creation of the predictive model(s), as represented by the arrow from module 202 to predictive model generation module 206. As mentioned earlier, some AAC-level data record may, on the other hand, represent scoreable transactions (e.g., bankruptcies, divorce filings, judgments, openings of additional credit accounts, and other events which may impact the level of financial risk of a particular account and/or account holder). If an AAC-level data record is considered to be a scoreable transaction (according to some predefined table, for example), it may be passed to scoreable transactions collection/archiving module 204 to facilitate subsequent scoring.

Scoreable transaction collection/archiving module 204 represents the module wherein scoreable transactions are collected for predictive model generation and pattern generation/scoring. Scoreable transactions, as mentioned previously, may include authorization transactions, clearing/settlement transactions, scoreable AAC-level data, and the like.

Scoreable transactions collected for scoring may also be archived and retrieved as needed from the archive for performance evaluation. The archived scoreable transactions also advantageously serve as a database from which samples may be developed (via appropriate statistical techniques) to build other predictive models. Further, scores produced by pattern generation/scoring module 208 may also be archived along with the scoreable transaction (e.g., for performance evaluation purposes in the future).

As in the case with module 202, scoreable transactions records are preferably checked for validity and reasonability prior to being employed for pattern generation/scoring. Exceptions are reported to FRPS management module 112 (of FIG. 1) for error resolution and/or reporting to the source(s) of the erroneous scoreable transaction data. In one embodiment, scoreable transactions are logged to ensure that events are not overlooked or double processed, which may skew the scores and/or yield an inaccurate predictive model.

Data collection activities in modules 202 and 204 may include activities necessary to sample and prepare, in the proper format, data employed for model development and/or scoring. For example, data collection may involve data manipulation. Data manipulation may include, for example, data sampling, filtering, matching, and transformation. As such, data collection may include selecting sample (good and high risk) data records from the scoreable transaction archives and customer/account data stores for use in creating the set of data samples employed for the actual model generation. As a further example, data manipulation may include any cross matching and/or sorting required on the data samples.

Predictive model generation module 206 represents the module wherein selected non-current AAC-level data (e.g., account data, public records data, and the like) as well as selected non-current transactional data (e.g., archived authorizations, clearings and settlements, and the like) are employed to create the predictive model(s). In one embodiment, predictive modeling creation employs neural net methodologies. Different statistical techniques may also be employed to create predictive models. For example, predictive models employed for different purposes (e.g., fraud detection vs. bankruptcy prediction) may employ different statistical techniques (e.g., decision tree, linear regression, logistical regression, fuzzy sets, and the like) in the creation of the predictive models. It should be appreciated that there may be multiple predictive models generated for different purposes (e.g., bankruptcy prediction, risk prediction, fraud, and the like). Accordingly, a scoreable transaction may produce multiple scores, depending on which predictive model(s) is employed.

In one embodiment, predictive model generation module 206 encompasses the activities necessary to develop, verify, and implement the prediction model(s). Model generation may include the selection of patterns, i.e., the selection of financial risk features or patterns, (e.g., bankruptcy as well as non-bankruptcy) from the data samples selected (the terms pattern and feature are essentially synonymous herein).

The predictive model may consist of model metadata (which may represent pattern weights, calibration factors, and other data which characterizes and conditions the functionality of the predictive model), along with the segmentation rules, exclusion rules, selected paterns, and reason codes that define the model. In one embodiment, the predictive model may, for example, include model cubes and model profiles. Model cubes are model definition and characterization data, and may contain summarized dimensional data (i.e., Merchant Category Code or "MCC", country, zip, MCC-country, MCC-country-zip, and the like) used by the predictive models. Model cubes may also contain the metadata (e.g., the pattern weights), and the basic descriptive data. The model cubes (so called since they contain multi-dimensional data) may be implemented as RAM-cached multi-dimensional databases of summarized dimensional data and the metadata that supports the predictive model. Model profiles represent profiles for tracking historical model-generated information pertaining to a given account. In one embodiment, model profiles represent cumulative values of model variables relating to accounts and account holders.

The model developed may be employed to generate patterns. Pattern generation may involve pattern identification using statistical analysis tools and pattern transformation using, for example, smoothing techniques. The selected data samples and generated patterns may then be employed in the analysis leading to one or more predictive models. During actual production, i.e., during scoring of incoming scoreable transactions, the generated patterns, along with the model or a version thereof may be employed to score the incoming scoreable transaction to assess financial risk.

Pattern generation/scoring module 208 represents the main production module which uses the predictive model (created in predictive model generation module 206) to score the scoreable transactions collected via scoreable transactions collection/archiving module 204. In one embodiment, pattern generation/scoring module 208 employs neural network methodologies to analyze the scoreable transactions against the predictive models in order to derive transaction patterns indicative of high risk accounts and/or account holder and to derive financial risk scores.

Pattern generation/scoring module 208 may, for example, take as inputs the model cubes and model profiles generated in predictive model generation module 206. Transaction fields of the scoreable transaction may then be joined to dimensional data associated with the model cubes to give the statistical transaction patterns for that particular account. The pattern may then be joined to the historical profile supplied in the model profile for the account to show trends (the account profile is also then updated). Transactions across multiple accounts may also be joined to account holder data to provide an account holder-level pattern (consolidated pattern generation). The consolidated (account holder-level) profile may also be updated.

Scoring scoreable transactions against the predictive models may also produce account scores, i.e., scores assigned to accounts based on the scoreable transaction and/or the derived account-level pattern. By way of example, in account scoring, the pattern generated from the scoreable transaction is joined to model metadata using machine intelligence to generate an account-level score and reason codes. In one embodiment, the higher the score, the higher the probability that the account and/or account holder is at financial risk.

As mentioned, scoring scoreable transactions against the predictive model may yield consolidated scores, i.e., scores assigned to a particular account holder based on transactions across different accounts and/or even different account issuers. For example, the augmented scoreable transaction with its account-level scoring data may be joined to customer data to provide account holder-level detail. Using this information, the consolidated profile (e.g., the relational table containing the cumulative and smoothed variables used by the predictive models by account holder ID) may also be updated. Account holder-level patterns, account scoring and last account patterns may then be joined to the metadata using machine intelligence to generate an account holder-level score and reason codes. Still further, recently generated account-level and account holder-level scores may also be combined to produce a single score per reporting period for each account holder according to account issuer-specified parameters.

Score/alert reporting module 210 represents the module wherein financial risk alerts are created and formatted according to options specified by account issuers. For example, alerts to an account issuer may be triggered by an account-level score which exceeds the account issuer's predefined account score threshold. In general, the threshold controls the volume of alerts an account issuer receives. For example, raising the threshold tends to reduce the number of alerts received. Alert thresholds may be set for the account-level score, the consolidated (account holder-level) score, or the periodic combined score. Since FRPS 100 has access to customer/account data, it may be possible to issue a financial risk score and/or financial risk alert in a cross-account, cross-issuer manner. For example, a financial risk score indicative of a high risk of bankruptcy or fraud may result in an alert being sent to all account issuers of a particular account holder even though the transaction that culminates in the score originates from only one account with one account issuer. In general, the alerts may be formatted in accordance with any number of file format selected by the account issuers. Reports may be produced periodically, e.g., weekly, daily, or even in real time as scoreable transactions are received and scored against the predictive models.

Report delivery module 212 represents the module wherein alerts generated in score/alert reporting module 210 are transmitted to the data users (e.g., account issuers). With reference to FIG. 1, for example, the reports may be delivered to other data consumers 114, some of whom may route the reports to the account issuers. The reports may be delivered in accordance with the delivery options specified by the data users. In general, it should be appreciated that the delivery options may be widely varied. Transmission to each data user may also be noted in a reporting log for data tracking purposes. To ensure confidentiality, the reports may be encrypted using, for example, any suitable encryption option specified by the data users.

Performance analysis module 214 represents the module for performance planning and performance assessment of the financial risk prediction system. In one embodiment, both processes employ the aforementioned Online Analytical Processing (OLAP) DSS agent automated SQL query tool by Microstrategy, Inc. for data analysis and report delivery. As the term is used herein, performance planning generally refers to the development analysis employed to achieve adequate quality assurance before the integration of new predictive models, storage methods, or other changes into the financial risk prediction system. Performance assessment generally refers to the analysis of the changes after integration into the financial risk prediction system. The data obtained from performance analysis module 214 may then be employed to improve the creation of subsequent predictive model(s) and/or to improve the integration of the predictive model(s) into the production environment (i.e., for scoring the scoreable transactions).

Figure 4:
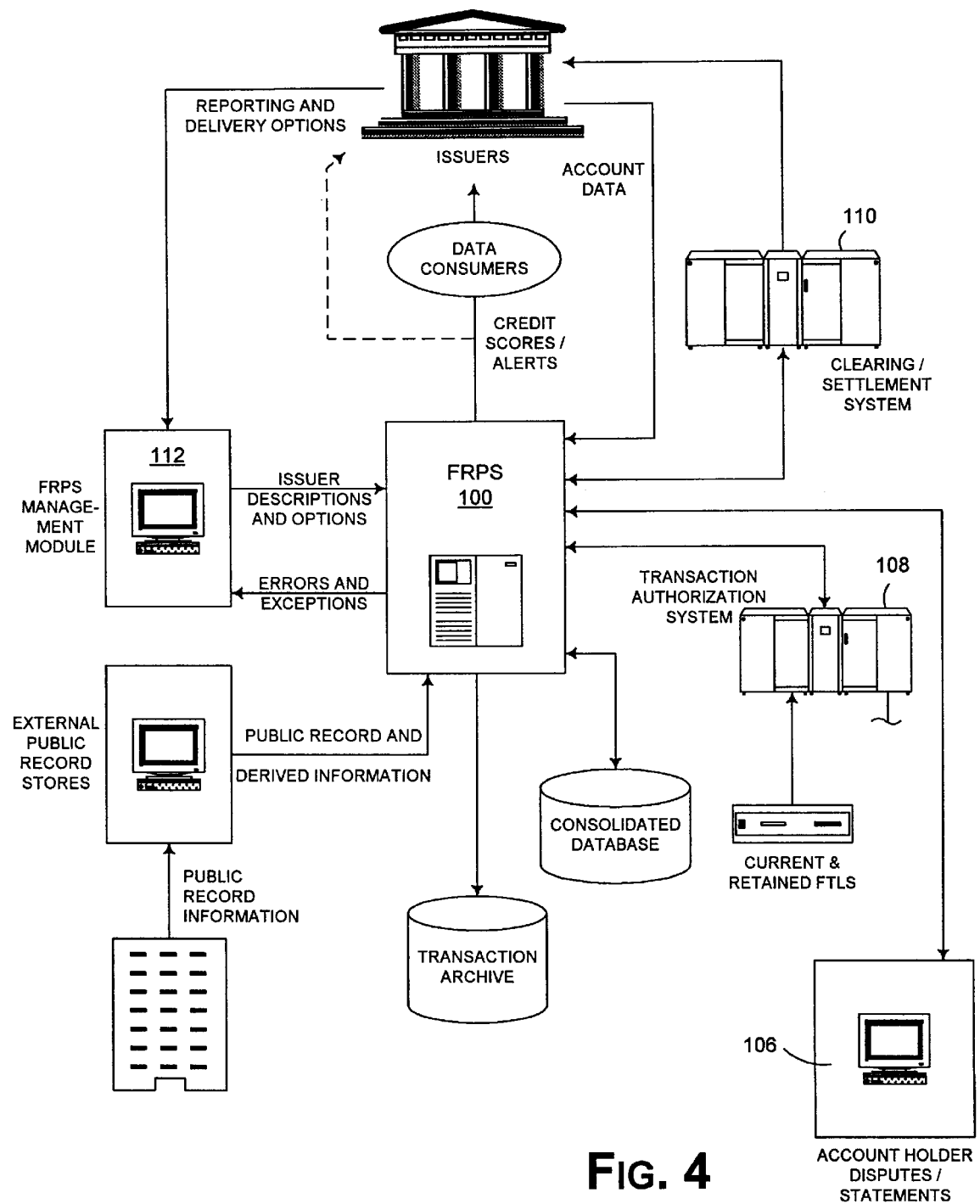
FIG. 4 depicts, in accordance with one embodiment of the present invention, the hardware model of the financial risk prediction system and its associated data sources and sinks.

To further illustrate the relationship between FRPS 100, its inputs and outputs, and various data sources and sinks to which it is coupled, FIG. 4 depicts, in accordance with one embodiment of the present invention, the hardware model of FRPS 100 and its associated data sources and sinks. In FIG. 4, items having like reference numbers as items in FIGS. 1–3 are substantially similar and perform substantially similar functions.

Figure 5:
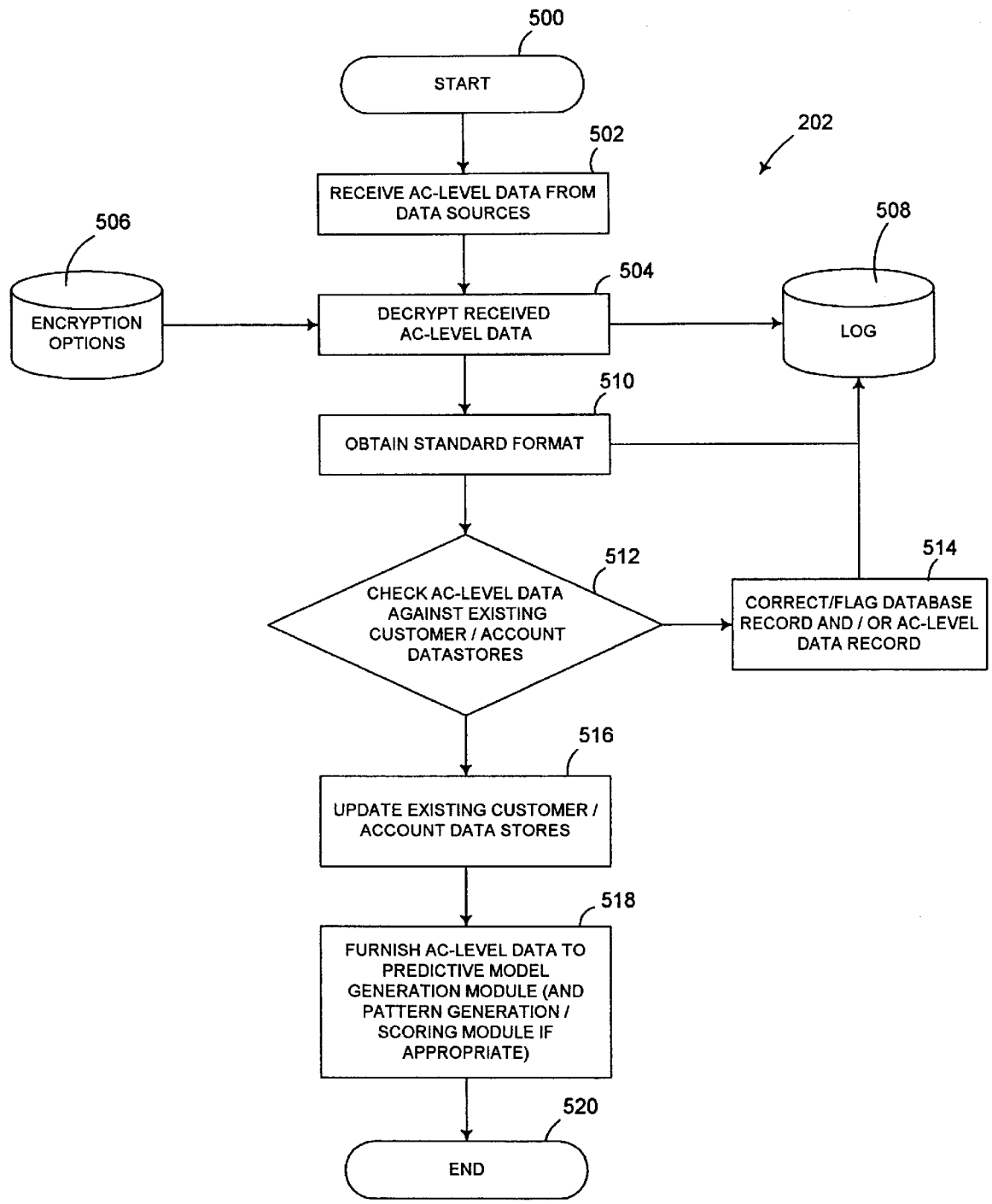
FIG. 5 illustrates, in accordance with one embodiment of the present invention, the steps for implementing account/account holder data collection/archiving module of FIG. 2.

FIG. 5 illustrates, in accordance with one embodiment of the present invention, the steps for implementing account/account holder data collection/archiving module 202. In block 502, the account/account holder-level (AAC-level) data from various data sources are obtained. With reference to FIG. 3A, for example, the AAC-level data may represent account data from account issuer 102, public record data from external public record stores 104, account holder dispute actions (106) from the account holders and the like.

The AAC-level data received in block 502 is then decrypted in block 504. The decryption may employ encryption options 506, which may be specified by the data source of the AAC-level data (via FRPS management module 112). Encryption options 506 may also be derived from account issuer data stores. As mentioned earlier, the account issuer data store represents the data base which identifies the participating account issuers and specifies their scoring, reporting, and encryption options.

The decrypted AAC-level data record may then be logged (block 508) to facilitate maintenance and/or performance analysis. Thereafter, the decrypted AAC-level data is transformed into a standard internal format for use by the financial risk prediction system (block 510). In block 512, the AAC-level data record is checked against existing customer/account data stores (block 512) to determine whether the account-related AAC-level data record is valid. By way of example, if the AAC-level data file never changes from one reporting period to the next, a flag may be raised to alert the administrator of FRPS 100 that this account issuer may inadvertently send the same AAC-level data file every report cycle.

If unacceptable errors are detected in the incoming AAC-level data record (e.g., errors in any of the "critical" data fields such as social security number, account number, and the like), the AAC-level data record and/or the existing customer/account data base may be corrected. Alternatively or additionally, the AAC-level data record and/or the existing customer/account data base may be flagged for error (block 514). The error is also logged to keep a record of the AAC-level data records and/or customer/account data base records that contain the error (block 508).

If the errors found in block 512 are deemed acceptable or if no errors are found, the AAC-level data record received in block 502 may be employed to update the existing customer/account data store (block 516). The AAC-level data records may subsequently be selected, using an appropriate statistical method, and furnished to the predictive model generation module (module 206 of FIGS. 2 and 3) to facilitate the creation of a predictive model for use in scoring scoreable transactions.

Further, some AAC-level data records may be deemed scoreable transactions (e.g., bankruptcy and divorce filings, judgments, newly opened credit accounts, and the like) since they impact the level of financial risk pertaining to a particular account and/or account holder. In these cases, the AAC-level data may be subsequently furnished (block 518) to pattern generation/scoring module (module 208 of FIGS. 2 and 3) to permit the financial risk prediction system to perform scoring on these scoreable transactions against existing predictive models.

Figure 6:
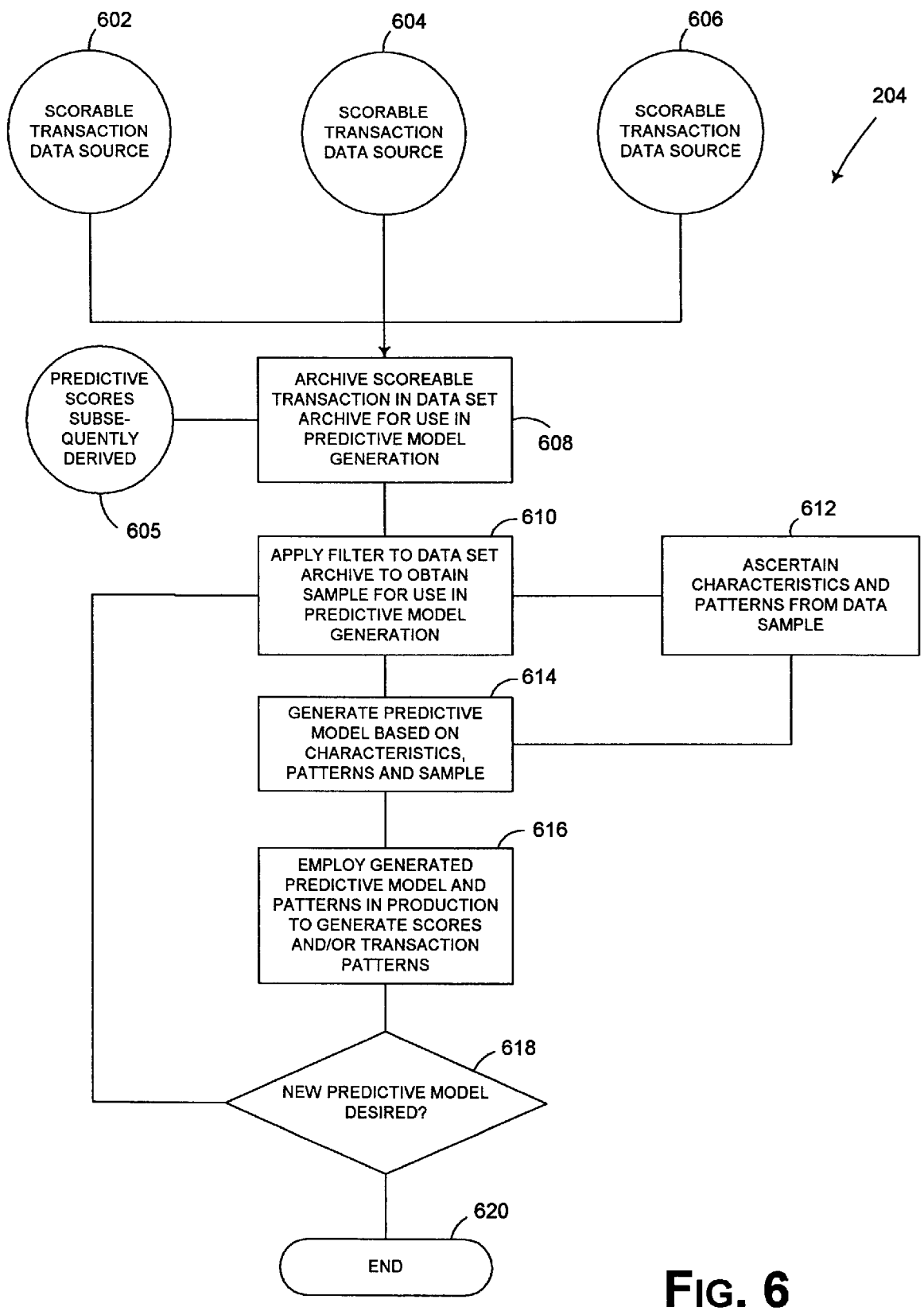
FIG. 6 is a flow chart illustrating, in accordance with one embodiment of the present invention, the steps employed in implementing the scoreable transaction collection/archiving module of FIG. 2.

FIG. 6 is a flow chart illustrating, in accordance with one embodiment of the present invention, the steps employed in implementing the scoreable transaction collection/archiving module 204 of FIG. 2. As mentioned earlier, the invention preferably assesses financial risk based on recent scoreable transactions such as authorization transactions, clearing and settlement transactions, and other scoreable transactions that may have an impact on an account holder's risk level (e.g., divorce filings, judgments, openings of new credit accounts). This is in sharp contrast with prior art methods which tend to rely on data which is more dated, e.g., historical payment data, as previously discussed. By taking advantage of the immediacy of transaction-based data, more timely scoring and alerts which pertain to the financial risk level of a particular account and/or account holder, may be generated.

Referring now to FIG. 6, there are shown a plurality of scoreable transaction data sources 602, 604, and 606. As discussed earlier in connection with FIGS. 2 and 3, the invention advantageously obtains scoreable transaction data from a plurality of accounts and/or account issuers to improve the accuracy of the predictive model(s) formed, the accuracy of the scoring process, and/or the number of scoreable events available in assessing the financial risk associated with an account and/or an account holder.

Furthermore, the present invention obtains its scoreable transaction data from a variety of sources. The inventiveness lies in part in the recognition that an individual account issuer typically only has, under present financial systems and structures, account and transaction data pertaining only to certain accounts and/or account issuer. If financial risk prediction is implemented by an account issuer (i.e., based on data available only to that account issuer), it is typically not possible to generate alerts at the consolidated account holder level across account issuers and accounts since account issuers typically do not, based on legal and competitive reasons, share transactional and account data.

Part of the invention lies in the recognition that opportunities exist, under current payment systems, for collecting scoreable transactions from a multitude of accounts and/or issuers. In particular, scoreable transactions may be obtained from transaction authorization systems (e.g., the aforementioned VISA Integrated Payment System ("VIP)), which receive and process authorizations across accounts and/or account issuers. Another part of the invention lies in the recognition that scoreable transactions may also be obtained from clearing and settlements systems (e.g., a system known as "BASE II," which is employed by VISA), i.e., systems for settling financial transactions among account issuers, merchants, and the account holder. Still further, part of the invention lies in the recognition that certain account/account holder level (AAC-level) events may also constitute credit-impacting scoreable transactions. By cross-referencing scoreable transactions against the customer/account data stores and employing an account holder-level search key (e.g., the account holder's social security number), the inventive financial risk prediction system advantageously facilitates the generation of transaction patterns and/or financial risk scores across accounts and/or account issuers.

The scoreable transactions received from sources 602, 604, and 606 are archived in a data set archive for use as samples in the subsequent generation of predictive models (block 608). The data set archive also receives as inputs the scores generated for the scoreable transactions (from block 605). Note that the invention advantageously does not typically apply, as part of the predictive model building, filtering to scoreable transactions as they are received from the various scoreable transaction data sources. Although prefiltering the scoreable transactions would have the effect of obtaining only the samples desired for building the required predictive model(s) at a particular point in time (and thereby reducing the number of scoreable transaction records that need to be archived), there are disadvantages.

For example, unless all scoreable transactions are archived, it is not possible to retrieve transactions from an archive to rebuild another sample based on different filters. The building of different samples from the same data set archive may be useful, for example, during performance analysis. The same data set archive may also be employed to build different models for different markets and purposes (e.g., a Canadian model versus a European model, a bankruptcy risk prediction model versus a fraud prediction model, and the like). If scoreable transaction data are prefiltered prior to being archived, it would be necessary to wait for a period of time, as for example an additional couple of months, prior to filtering another set of samples from the incoming scoreable transactions data. In the present invention, the availability of the complete and unfiltered scoreable transaction archive makes it possible to rapidly obtain different predictive models (by simply applying different filters to the archive). As can be appreciated by those skilled in the art, the availability of the data set archive specifically for the purpose of building predictive models advantageously cuts down the time required to acquire sampled data, thereby permitting the inventive financial risk prediction system to flexibly respond to the result of performance analysis or the requirements of different data users.

Referring back to FIG. 6, filters are applied in block 610 against the data set archive of block 608 to obtain the appropriate sample for building the desired predictive model. As can be appreciated by those skilled in the art, the specific filters applied depend on the predictive model desired (which may, for example, be tailored for a particular geographic location, a particular type of transaction, a particular type of financial risk, and the like). The filters may be designed in accordance with any number of well known statistical methods. For example, one technique involves the selection of a statistically significant sample of archived scoreable transactions (e.g., 2% of the entire archive in one embodiment) which is reflective of the type of financial risk the predictive model is tailored for. Filtering in block 610 yields one or more sets of data samples which may then by employed in the actual creation of the predictive model(s).

In block 612, characteristics and patterns are then ascertained from the samples of block 610. Characteristics may represent one or more data fields of the scoreable transaction data (or a combination thereof, such as dollar amounts spent, location, and the like). Patterns are generally lists of characteristics which reflect a trend indicative of how a particular account holder uses his credit. The samples of block 610 and the characteristics and patterns ascertained in block 612 are then employed to create the predictive model in block 614. In one embodiment, neural network methodologies are employed in creating the predictive model(s) from the samples, characteristics, and patterns.

The predictive models created in block 614 are then employed in block 616 to generate scores for transactions in actual production. This aspect of the invention is explored in greater detail in FIGS. 7 and 8 herein. If it is found during production that the predictive model created in block 614 is inadequate or if a different predictive model is desired (block 618), other filters may be applied against the data set archive of block 608 to obtain new samples for building new predictive model(s).

Figure 7:
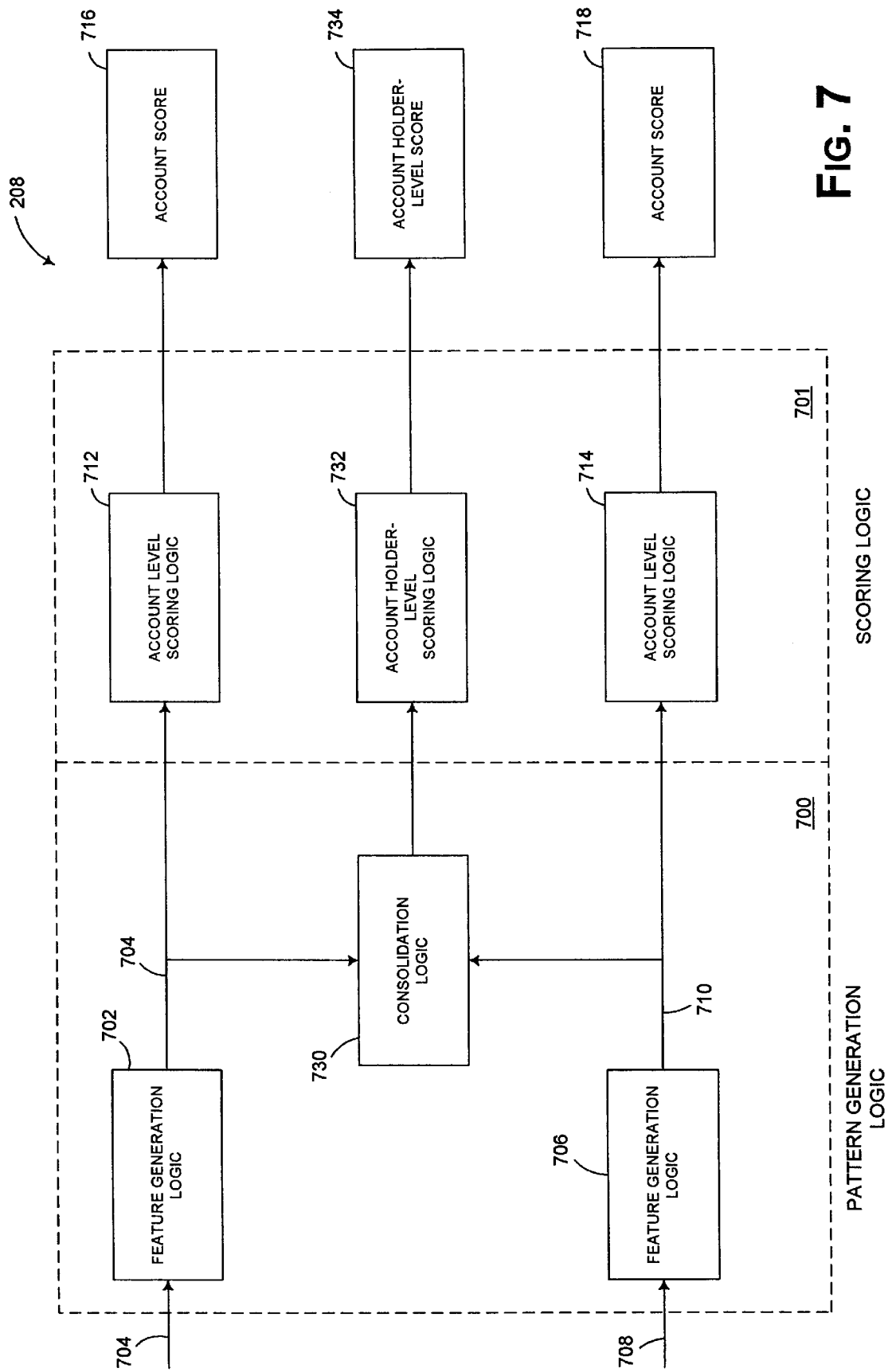
FIG. 7 illustrates, in accordance with one aspect of the present invention, a logic diagram depicting the process involved in scoring scoreable transactions.

FIG. 7 illustrates, in accordance with one aspect of the present invention, a logic diagram depicting the process involved in scoring scoreable transactions. For ease of discussion, scoreable transactions involving only two accounts of a given account holder are employed although any number of transactions may be accommodated. As seen in FIG. 7, pattern generation/scoring logic module 208 is implemented by two logic modules: pattern generation logic module 700 and scoring logic module 701.

In pattern generation logic module 700, pattern generation logic 702 may receive from input 704 one or more scoreable transactions pertaining to the first account. From the scoreable transactions, pattern generation logic 702 generates on output 704 a plurality of floating point vectors representing patterns. Analogously, pattern generation logic 706 (which may be implemented by the same codes as those implementing pattern generation logic 702) receives from input 708 one or more scoreable transactions pertaining to the second account of the account holder. From the scoreable transactions, pattern generation logic 706 generates on output 710 a plurality of floating point vectors representing patterns reflective of, for example, spending habits by the account holder. Additional details pertaining to pattern generation logic 702 and 706 may be found in the aforementioned co-pending patent application Attorney Docket No. VISAP002.

Figure 8:
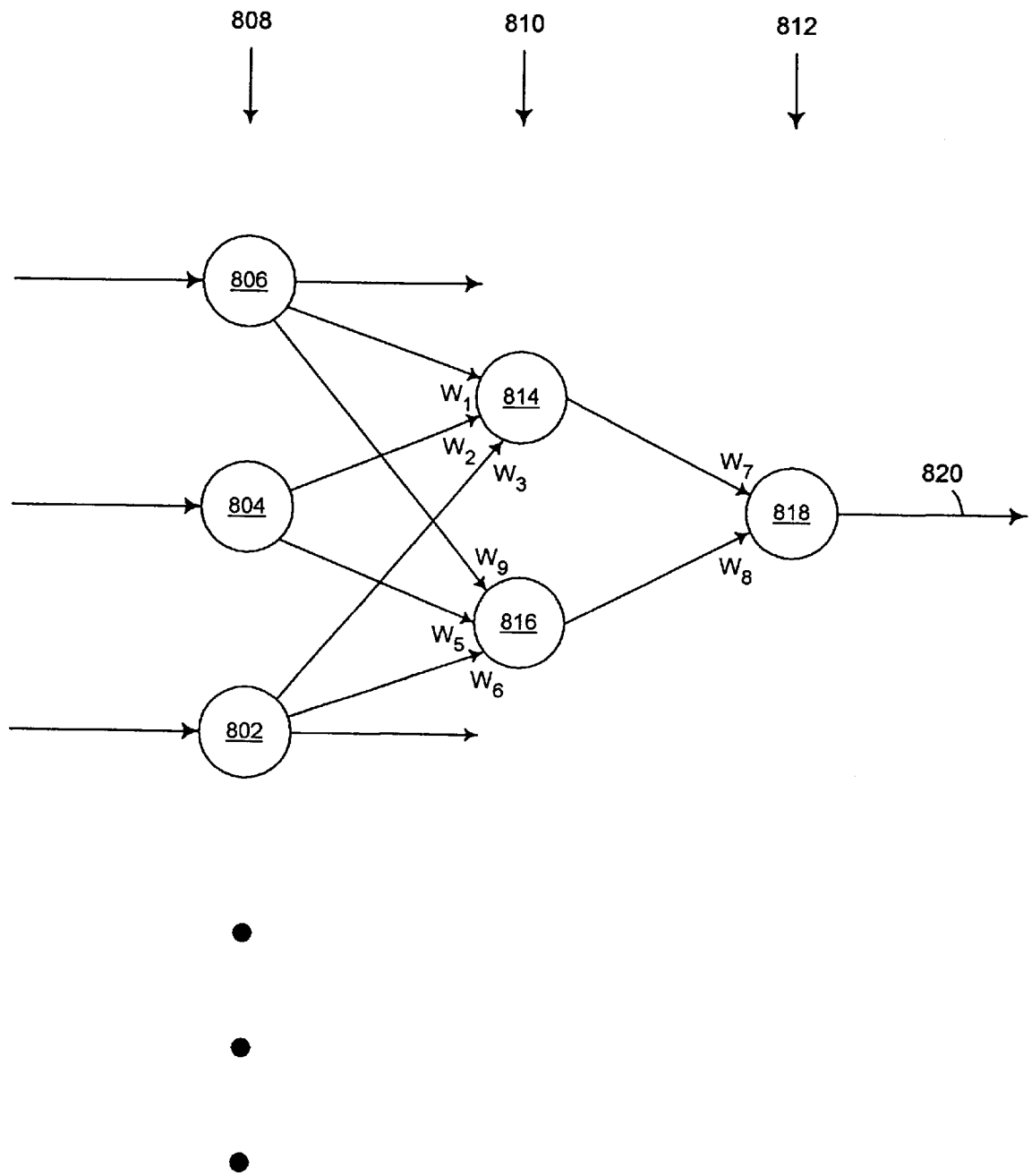
FIG. 8 illustrates in greater detail one technique employing neural net methodology for deriving account-level scores from patterns generated from scoreable transactions.

The patterns generated by pattern generation logic 702 and 706 are input into respective account-level scoring logic 712 and 714 for account-level scoring to derive respective account-level scores 716 and 718. FIG. 8 illustrates in greater detail one neural net technique for deriving account-level scores from patterns generated from scoreable transactions. In FIG. 8, the floating point vectors representing the patterns at output 704 are input into input processing elements 802, 804, and 806 of input layer 808. The input elements may multiply each input vector by a weight W and transform the vector using an appropriate transfer function to derive a state of the element.

The states of the elements may then be passed via connections of the neural net to a plurality of intermediate processing elements 814 and 816 of intermediate layer 810. Although only one intermediate layer 810 is shown, it should be appreciated that multiple intermediate processing layers may be present in a given neural net. Intermediate elements may multiply their inputs by appropriate weights, sum the result and transform the sum using an appropriately designed transfer function. The multiple intermediate layers permit the neural net to more accurately learn the desired mapping between the inputs to the neural net and its output (s).

The outputs of intermediate elements in the intermediate layer are furnished to output element 818 of output layer 812. The output of output element is then furnished on output 820 as the desired score. To train the neural network of FIG. 8, for example, patterns from known data sets with known results (i.e., historical scoreable transactions, the associated account, and the known risk level) are iteratively furnished to the neural net of FIG. 8. The outputs obtained at output 820 are compared to the known results to measure the error. The weights accorded to the various connections between elements may then be modified. The training process continues until changes to weights no longer produce improvements in the error measured. Once trained, the resulting neural net may be employed for scoring new scoreable transactions. In general, neural net methodologies are well known to those skilled in the art, and many different techniques exist for their implementation and training.

Referring back to FIG. 7, the patterns output on outputs 704 and 710, which may be derived at different times, may also be combined and input into consolidation logic 730 to derive account holder-level patterns. The account holder-level patterns may subsequently be input into account holder-level scoring logic 732 to obtain account holder-level 734. Account holder-level scoring logic 732 may also be implemented via neural net technologies, employing for example a methodology substantially similar to that disclosed in connection with FIG. 8.

Subsequent to scoring, the derived scores may be used to generate alerts in accordance with thresholds set by the account issuers. The scores and/or alerts may then be furnished to the data consumers, e.g., account issuers, to enable the account issuers to take steps to protect existing credit lines if appropriate.

Figure 9:
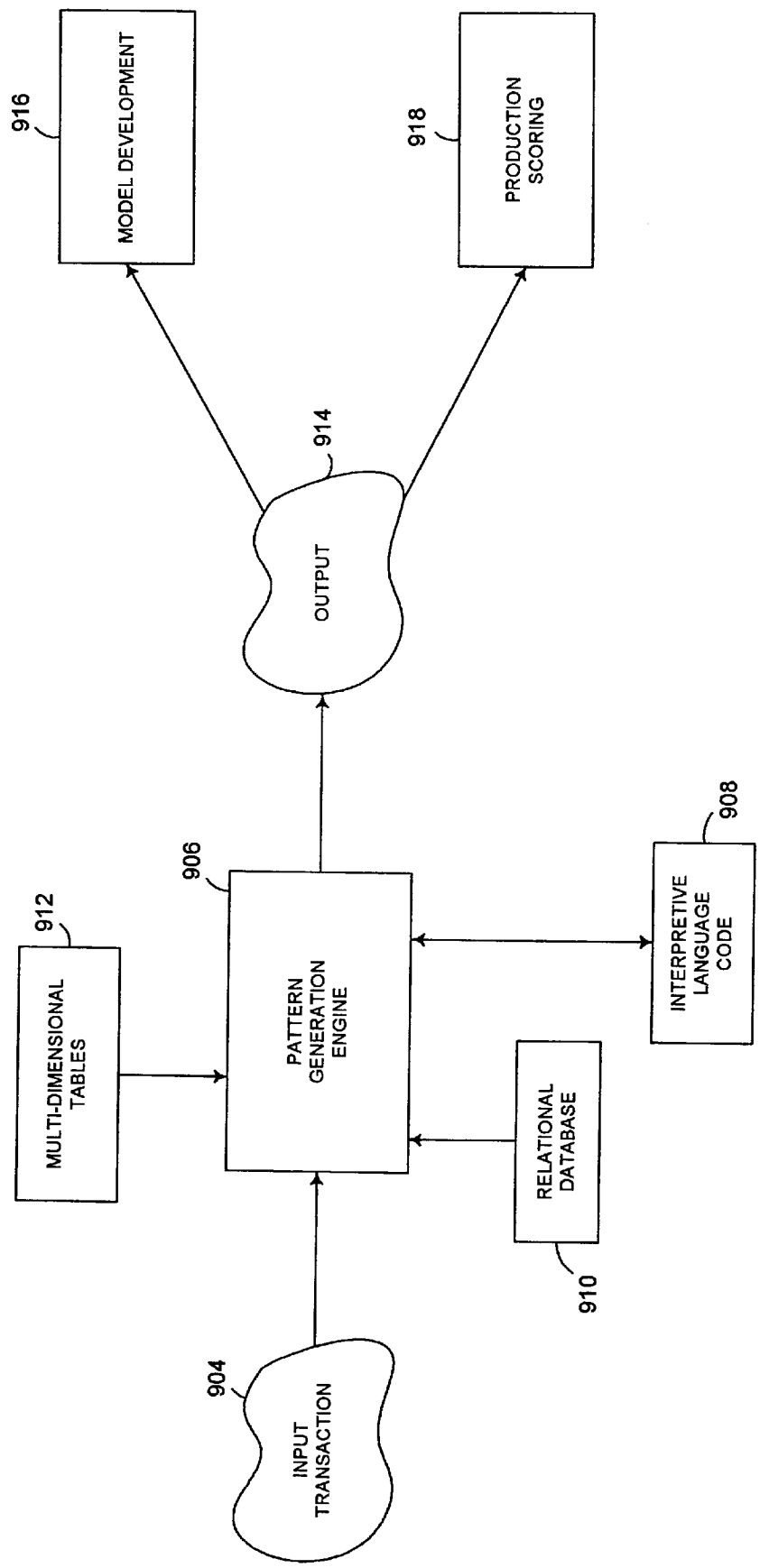
FIG. 9 is a diagrammatic representation of the flow of scoreable transaction data through a pattern generation engine in accordance with an embodiment of the present invention.

FIG. 9 is a diagrammatic representation of the flow of scoreable transaction data through a pattern generation engine in accordance with an embodiment of the present invention. In general, a pattern generation engine is a software engine which may be used to transform scoreable transaction data into "pattern" data or the output from a series of characteristic variables, for use in a risk prediction model. As mentioned, scoreable transactions may include any event that may impact a credit holder's credit risk level (e.g., authorizations and clearing and settlement transactions for purchases of goods or services on credit or cash withdrawal on credit, public record data, customer payment data, check clearing, and the like). In the described embodiment, a pattern generation engine is used to transform scoreable transaction data into characteristic variables, or data features, which are used in either or both a model development process or an associated transaction scoring process, which will be described below. Such a pattern generation engine is further arranged to analyze high-volume streams of data in real-time.

In accordance with one aspect of the present invention, the operators are efficiently organized for the specific purpose of providing flexible variable characterization and high speed operation. The operators that do not directly contribute to the purpose of characteristic variable generation are advantageously eliminated, thereby enabling high speed processing to occur. The operators are also organized to enable a large combination of characteristic variables to be derived simply by reorganizing the order of the operators.

An input transaction 904, which is generally a scoreable transaction performed using an account, e.g., credit card, is provided as an input to a pattern generation engine 906. The customer who has possession of the account, i.e., the account holder, generates input transaction 904 when he or she performs a transaction using the account (such as by using a bankcard). Typical transactions include making purchases, obtaining cash advances, and the like. It should be appreciated that transactions may be widely varied, and may not necessarily reflect only transactions performed using a bankcard. By way of example, transactions may also include processing customer account information to determine whether a customer qualifies for a personal loan, as well as processing customer account information to determine if a check written by the customer is likely to be rejected.

Input transaction 904 may be characterized by a high speed data stream which includes, but is not limited to, data fields which contain information relating to a transaction type, data fields which contain information relating to the parties involved in the transaction, and data fields which contain various other information related to the transaction, e.g., the cost of a transaction. In general, input transaction 904 is stored in a data source (not shown) which may typically either be a data file or a database, as for example an account database or a customer database. Such a data source may be maintained by the account issuer which issued the account involved in input transaction 904.

Once input transaction 904 is obtained, input transaction 904 is provided as an input to a pattern generation engine 906. Pattern generation engine 906 is essentially a software analyzer which may be used to, among others, generate substantially any desirable pattern, e.g., financial characteristic. In the described embodiment, the desirable patterns are generated using a fixed set of operators composed using an interpretive language code.

The operation of pattern generation engine 906 involves interpretive language code 908, a relational database 910, and multi-dimensional tables 912 which are all essentially a part of pattern generation engine 906. Interpretive language code 908 includes the fixed set of operators, which are applied to input transaction 904 to create desired characteristics. Such desired characteristics may include, but are not limited to, for example, the number of times a particular type of transaction was performed over a fixed period of time and the cost accrued with transactions processed during a particular period of time. It should be appreciated that substantially any characteristic which may be of interest to a financial institution may be derived using the set of operators associated with interpretive language code 908, and, therefore, pattern generation engine 906.

As substantially any relevant characteristic may be derived using the set of operators associated with interpretive language code 908, it should be appreciated that the use of interpretive language code 908 enables new characteristics to be generated by simply combining the operators, and changing the values of operands that are operated upon by the operators. In contrast to the inefficient, conventional need to rewrite a hard-coded higher-level computer program to generate new characteristics, the ability to recombine operators at an intermediate programming level, e.g., using a pseudo-language that may be interpreted to generate new characteristics, does not require any changes to be made to a hard-coded, higher-level computer program. This aspect of the invention is discussed further in the aforementioned co-pending patent application (Attorney Docket No. VISAP002). Further, the use of an intermediate programming level also enables parameters associated with operators to be readily modified, essentially, "on-the-fly," or in real-time. As such, any desired characteristic variable may be obtained without requiring changes to be made to a higher-level computer program.

In the described embodiment, interpretive language code 908 is created using a high-level programming language. That is, the operators associated with interpretive language code 908 may be coded using any suitable programming language. By way of example, the operators may be coded using the C programming language.

Relational database 910 is arranged to store scoreable transaction information. By way of example, lags, or time series, of transaction data may be stored in relational database 910. In one embodiment, relational database 910 may be either an account database or a customer database. When the creation of a desired characteristic requires the use of a series of values associated with previous transactions performed on a particular account, the previous values may generally be obtained from relational database 910.

Multi-dimensional tables 912 are generally n-dimensional matrices which include parameters that have multiple "keys," which include, but are not limited to, a merchant identifier, a location code, and a zip code. Multi-dimensional tables 912 may contain parameters, as for example risk values, which are not stored in a database, such that the parameters are readily accessible to pattern generation engine 906.

Once input transaction 904, which, as previously mentioned, is a scoreable transaction, has been processed by pattern generation engine 906, the "output" 914, i.e., the characteristic variable, is forwarded either to a model development process 916 or to a production scoring process 918 that is associated with model development process 916. Although model development process 916 may be used to develop any suitable model which uses characteristic variables related to financial transactions, e.g., financial data features, model development process 916 is generally used to develop a financial risk prediction model.

Production scoring process 918 is generally used as an input to the scoring logic of a model, e.g., a financial risk prediction model, developed using model development process 916. In other words, production scoring process 918 may be used to associate a score with a particular characteristic value such that a risk may be assessed. Further discussion pertaining to the scoring process may be found, as mentioned, in the co-pending patent application (Attorney Docket No. VISAP002).

While this invention has been described in terms of several preferred embodiments, there are alterations, permutations, and equivalents which fall within the scope of this invention. It should also be noted that there are may alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for predicting financial risk, the computer-implemented method comprising:

receiving transaction data pertaining to a plurality of transactions for a credit account, said transaction data including at least one of a transaction type and a transaction amount for each transaction of said plurality of transactions;

scoring said transaction data, wherein scoring said transaction data includes scoring a transaction pattern ascertained from said transaction data based on a preexisting model to form a score for said credit account, the transaction pattern being indicative of a pattern associated with the plurality of transactions for the credit account, said transaction pattern being arranged to include events that impact the financial risk;

determining when said score is below a predefined financial risk; and transmitting said score to an account issuer of said credit account when it is determined that said score is below the predefined financial risk.

2. A computer-implemented method as recited in claim 1 wherein said account issuer is a first account issuer, the method further including:

transmitting said score to a second account issuer of a different credit account when said score is determined to be below said predefined financial risk, said second account issuer being different from said first account issuer.

3. A computer-implemented method as recited in claim 1 wherein said transaction data is current transaction data.

4. A computer-implemented method as recited in claim 3 further including:

generating the preexisting model, wherein the preexisting model is generated using non-current transaction data.

5. A computer-implemented method as recited in claim 1 further including:

archiving the transaction data.

6. A computer-implemented method as recited in claim 1 further including:

transmitting said score to a transaction authorization system, wherein when said score is determined not to be below the predefined financial risk, the transaction authorization system is arranged to deny an authorization request.

7. A computer-implemented method as recited in claim 1 further including:

generating a new model, the new model being arranged to replace the preexisting model, wherein the new model is generated using the transaction data and the preexisting model, wherein the transaction data includes current transaction data pertaining to a current transaction for the credit account.

8. A computer-implemented method as recited in claim 1 wherein said transaction data includes current transaction data and historical transaction data.

9. A computer-implemented method as recited in claim 2 wherein at least one of the first transaction data and the second transaction data includes current transaction data.

10. A computer-implemented method as recited in claim 1 wherein the transaction data includes scoreable transactions, the scoreable transactions including account/account holder-level data pertaining to an account holder of the credit account, the credit account being one of a plurality of credit accounts issued to the account holder.

11. A computer-implemented method as recited in claim 10 wherein the account/account holder-level data includes public records data.

12. A computer-implemented method as recited in claim 10 wherein the account/account holder-level data includes data other than data pertaining to an exchange of credit for one of goods, services, and cash.

13. A computer-implemented method as recited in claim 1 wherein the transaction data is scored in between billing cycles for the account issuer.

14. A computer-implemented method as recited in claim 1 wherein the transaction data includes financial transaction data obtained in between billing cycles for a account holder of the credit account.

15. A computer-implemented method for predicting financial risk, the computer-implemented method comprising:

receiving first transaction data pertaining to a first transaction performed on a first credit account, said first credit account representing a credit account issued to a given account holder by a first account issuer;

receiving second transaction data pertaining to a second transaction performed on a second credit account, said second credit account being different from said first credit account, said second credit account representing a credit account issued to said given account holder by a second account issuer, said second account issuer being different from said first account issuer;

scoring said first transaction data and said second transaction data, based on a preexisting model to form a combined score for said given account holder;

determining when the combined score is below a predefined financial risk threshold; and transmitting said combined score to at least one of said first account issuer and said second account issuer when it is determined that said combined score is below the predefined financial risk threshold.

16. The computer-implemented method of claim 15 wherein a social security number of said given account holder is employed as a key to identify said first credit account and said second credit account as being issued to said given account holder.

17. The computer implemented method of claim 15 further comprising:

determining when said combined score reflects a high level of financial risk;

transmitting said combined score to a third account issuer, said third account issuer bring different from both said first account issuer and said second account issuer when said combined score reflects the high level of financial risk, said third account issuer representing an issuer of credit to said given account holder.

18. A financial risk prediction system, the financial risk prediction system comprising:

a receiving mechanism, the receiving mechanism being arranged to receive scoreable transaction data from a first data source, the scoreable transaction data being associated with a first credit account issued to a given account holder by an account issuer, wherein the scoreable transaction data includes current transaction data;

an authenticator, the authenticator being in communication with the receiving mechanism, the authenticator being arranged to authenticate scoreable transaction data received by the receiving mechanism, wherein the scoreable transaction data includes transaction data for the first credit account and transaction data for a second account;

a scoring mechanism, the scoring mechanism being arranged to generate a score associated with the given account holder, the score being arranged to indicate a financial risk level of the given account holder, wherein the scoring mechanism is arranged to generate the score using the scoreable transaction data in conjunction with a predictive model;

an evaluator, the evaluator being arranged to compare the score against a predefined financial risk threshold;

a transmitter, the transmitter being arranged to transmit the score to the account issuer; and a transaction authorizing mechanism, the transaction authorizing mechanism being in communication with the receiving mechanism and being arranged to authorize a first current transaction included in the current transaction data by determining that the score does not exceed the predefined financial risk threshold.

19. A computer program product for predicting financial risk, the computer program product comprising:

computer code for receiving first transaction data pertaining to a first transaction performed on a first credit account, the first credit account representing a credit account issued to a given account holder by a first account issuer;

computer code for receiving second transaction data pertaining to a second transaction performed on a second credit account, the second credit account being different from the first credit account, the second credit account representing a credit account issued to the given account holder by a second account issuer, the second account issuer being different from said first account issuer;

computer code for scoring the first transaction data and the second transaction data based on a preexisting predictive model to form a combined score for the given account holder, the computer code for scoring including computer code for obtaining a first transaction pattern from the first transaction data and computer code for obtaining a second transaction pattern from the second transaction data;

computer code for determining when the combined score is below a predefined financial risk threshold;

computer code for transmitting the combined score to at least one of the first account issuer and the second account issuer when it is determined that the combined score is below the predefined financial risk threshold; and a computer readable medium that stores the computer codes, wherein the computer codes stored on the computer-readable medium are arranged to be accessed and processed by a computing system.

20. A computer-implemented method for predicting financial risk, the computer-implemented method comprising:

receiving transaction data pertaining to a plurality of transactions for a credit account, the transaction data including at least one of a transaction type and a transaction amount for each transaction of the plurality of transactions;

determining when the transaction data is valid;

scoring the transaction data when it is determined that the transaction data is valid, wherein scoring the transaction data includes scoring a transaction pattern ascertained from the transaction data based on a preexisting model to form a score for the credit account, the transaction pattern being indicative of a pattern associated with the plurality of transactions for the credit account, the transaction pattern being arranged to include events that impact the financial risk;

determining when the score is below a predefined financial risk; and transmitting the score to an account issuer of the credit account when it is determined that said score is below the predefined financial risk.

21. A computer program product for predicting financial risk, the computer program product comprising:

computer code for receiving transaction data pertaining to a plurality of transactions for a credit account, the transaction data including at least one of a transaction type and a transaction amount for each transaction of the plurality of transactions;

computer code for scoring the transaction data, wherein the computer code for scoring the transaction data includes computer code for scoring a transaction pattern ascertained from the transaction data based on a preexisting predictive model to form a score for the credit account, the transaction pattern being indicative of a pattern associated with the plurality of transactions for the credit account;

computer code for determining when the score is below a predefined financial risk;

computer code for transmitting the score to an account issuer of the credit account when it is determined that the score is below the predefined financial risk; and a computer-readable medium that stores the computer codes, wherein the computer codes stored on the computer-readable medium are arranged to be accessed and processed by a computing system.

22. A computer program product as recited in claim 21 wherein the transaction data is current transaction data.

23. A computer program product as recited in claim 22 further including:

computer code for generating the preexisting predictive model, wherein the preexisting predictive model is generated using non-current transaction data.

24. A computer-implemented method for assessing financial risk, the computer-implemented method comprising:

receiving current event data pertaining to a plurality of events for a first credit account issued to an account holder, the current event data including at least one of a transaction type and a transaction amount for each event of the plurality of events for the first credit account;

processing the current event data to generate a score associated with the account holder, wherein processing the current event data includes scoring an event pattern ascertained from the current event data based on a preexisting predictive model, the preexisting predictive model being generated using historical event data, the historical event data including data associated with the first credit account and data associated with at least a second credit account;

determining when the score is below a predefined financial risk threshold; and transmitting the score to a first account issuer of the first credit account when it is determined that the score is below the predefined financial risk threshold.

25. A computer-implemented method as recited in claim 24 further including receiving additional event data corresponding to a plurality of events for a second credit account issued to the account holder, the second credit account being issued by a second account issuer, wherein processing the current event data to generate the score associated with the account holder includes processing the additional event data.

26. A financial risk prediction system, the financial risk prediction system comprising:

a receiving mechanism, the receiving mechanism being arranged to receive scoreable transaction data from a first data source, the scoreable transaction data being associated with a first credit account issued to a given account holder by an account issuer;

an authenticator, the authenticator being in communication with the receiving mechanism, the authenticator being arranged to authenticate scoreable transaction data received by the receiving mechanism, wherein the scoreable transaction data includes transaction data from the first credit account and transaction data from a second credit account issued to the given account holder;

a scoring mechanism, the scoring mechanism being arranged to generate a score associated with the given account holder, the score being arranged to indicate a financial risk level of the given account holder, wherein the scoring mechanism is arranged to generate the score using the scoreable transaction data in conjunction with a predictive model;

an evaluator, the evaluator being arranged to compare the score against a predefined financial risk threshold; and a transmitter, the transmitter being arranged to transmit the score to the account issuer.

27. A financial risk prediction system according to claim 26 further including a modeler, the modeler being arranged to generate the predictive model.

28. A financial risk prediction system according to claim 27 wherein the modeler is further arranged to update the predictive model using the scoreable transaction data received by the receiving mechanism.

29. A financial risk prediction system according to claim 26 further inluding a data storage mechanism, the data storage mechanism being arranged to store the scoreable transaction data received by the receiving mechanism.

30. A financial risk prediction system according to claim 26 wherein the scoreable transaction data includes current transaction data.

31. A financial risk prediction system according to claim 26 wherein the transmitter is arranged to transmit the score when the score is below the predefined financial risk threshold.

32. A financial risk prediction system according to claim 26 further including a management module, the management module being in communication with the scoring mechanism, the management module being arranged to determine the predefined financial risk threshold.

33. A financial risk prediction system according to claim 26 wherein the receiving mechanism is farther arranged to receive additional data associated with the given account holder from a second data source.

34. A financial risk prediction system according to claim 26 wherein the scoring mechanism includes a pattern generator, the pattern generator being arranged to obtain a transaction pattern from the scoreable transaction data, the transaction pattern being used to generate the score.

* * * * *